Figure 2:
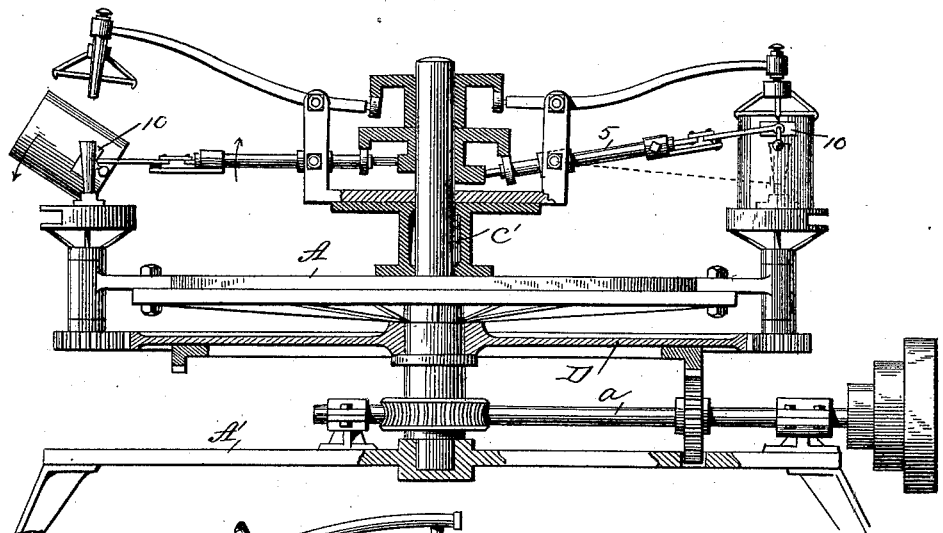

(No Model.) 3 Sheets—Sheet 1.
W. D. BROOKS.
CAN SOLDERING MACHINE.
No. 418,495. Patented Dec. 31, 1889.
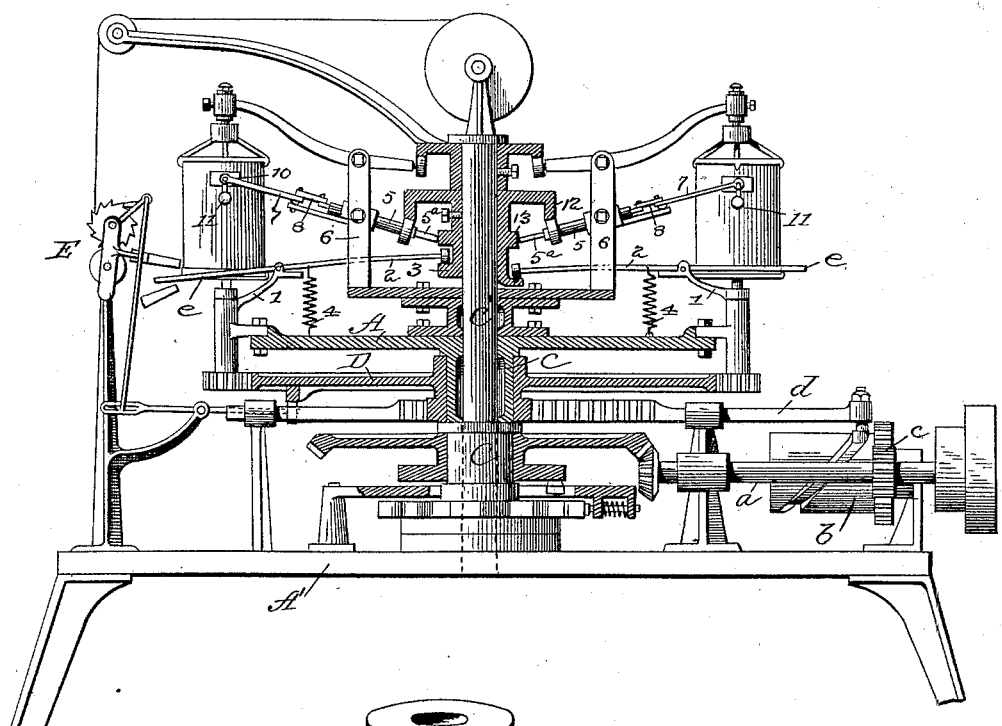
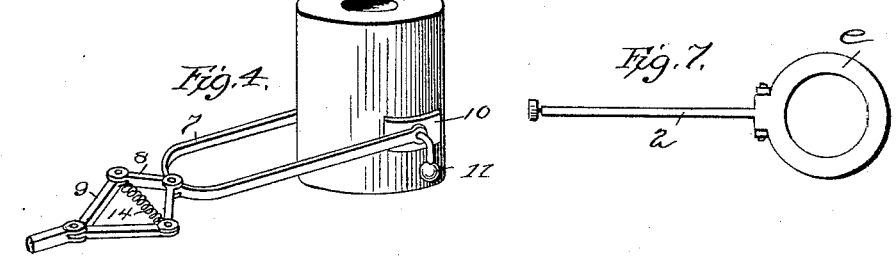
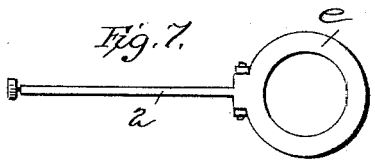
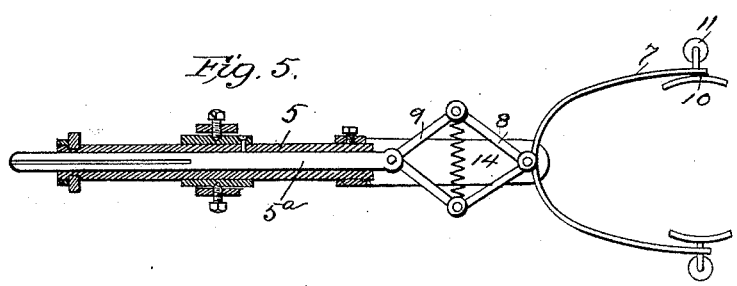
Attest:
Walter Donaldson
Walter P. Keene
Inventor
Wm. D. Brooks
by Ellis Spear
Atty.

(No Model.) 3 Sheets—Sheet 2.

W. D. BROOKS.
CAN SOLDERING MACHINE.

No. 418,495. Patented Dec. 31, 1889.

Attest:
Walter Donaldson
Walter F. Keene

Inventor
W. D. Brooks
by Ellis Spear
Atty.

(No Model.) 3 Sheets—Sheet 3.

W. D. BROOKS.
CAN SOLDERING MACHINE.

No. 418,495. Patented Dec. 31, 1889.

Attest
Inventor
Wm D. Brooks

UNITED STATES PATENT OFFICE.

WILLIAM D. BROOKS, OF BALTIMORE, MARYLAND.

CAN-SOLDERING MACHINE.

SPECIFICATION forming part of Letters Patent No. 418,495, dated December 31, 1889.

Application filed October 7, 1889. Serial No. 326,198. (No model.)

*To all whom it may concern:*

Be it known that I, WILLIAM D. BROOKS, of Baltimore, in the State of Maryland, have invented a new and useful Improvement in Can-Soldering Machines; and I do hereby declare that the following is a full, clear, and exact description of the same.

Heretofore in the soldering of the tops and bottoms of cans two machines have generally been used with transfer mechanism adapted to convey the cans from one machine after having been soldered upon one end, and place the cans in an inverted position upon the second machine for its action in soldering the unsoldered end.

It is the object of my present invention to dispense with the expense incident upon the use of two machines for this purpose, both in the cost of manufacture in the machines and the cost of running the same, and provide in a single machine means for soldering both ends of the can in the continuous operation of the machine and without adding materially to the ordinary machine shown in patents heretofore granted to me and operating on the order of the movements of the sun and planets. Heretofore, also, means have been provided to expose the edge of the can to be soldered at the solder-station, so as to allow for the application of the solder directly to the seam of the can. In the patent of John Solter, No. 397,758, dated February 12, 1889, the edge of the can was exposed by raising the can-seat at the solder-station, the solder-tube being normally in line with the edge of the can in its raised position. In Letters Patent granted to myself on the 26th day of March, 1889, No. 400,295, I attained the same object by lowering the top plate of the flame-chamber, while in another patent issued to John Solter issued on the 17th day of September, 1889, No. 411,070, this top plate was formed with a depression in front, which thus permanently exposed the edge of the can to the action of the solder-tube.

It is the object of my invention in this connection to provide for the exposure of the can edge at the solder-station, but at no other point, whereby I am enabled to more thoroughly heat the can edge than in the last-mentioned patent of Solter, as the edge of the can on the front in that patent is permanently exposed, and consequently does not receive the full effect of the heat from the flame-tube, because of the interposed depressed portion of the plate between the flame-tube and the edge of the can to be soldered.

Soldering-machines of this general class have heretofore been so arranged that the can-seats have either been driven continuously or intermittingly, and I have found by experience that with inside soldering, if the interior of the can is not well fluxed, the solder does not always flow freely, and thus is apt to form a dam and produce imperfect work. I overcome this difficulty by imparting to the can-seat a reciprocating movement instead of a continuous movement, and this has the effect, upon the change in direction of the rotary movement, to give a jar or shock to the molten solder and causes a more even distribution, thus producing better work.

Figure 3:
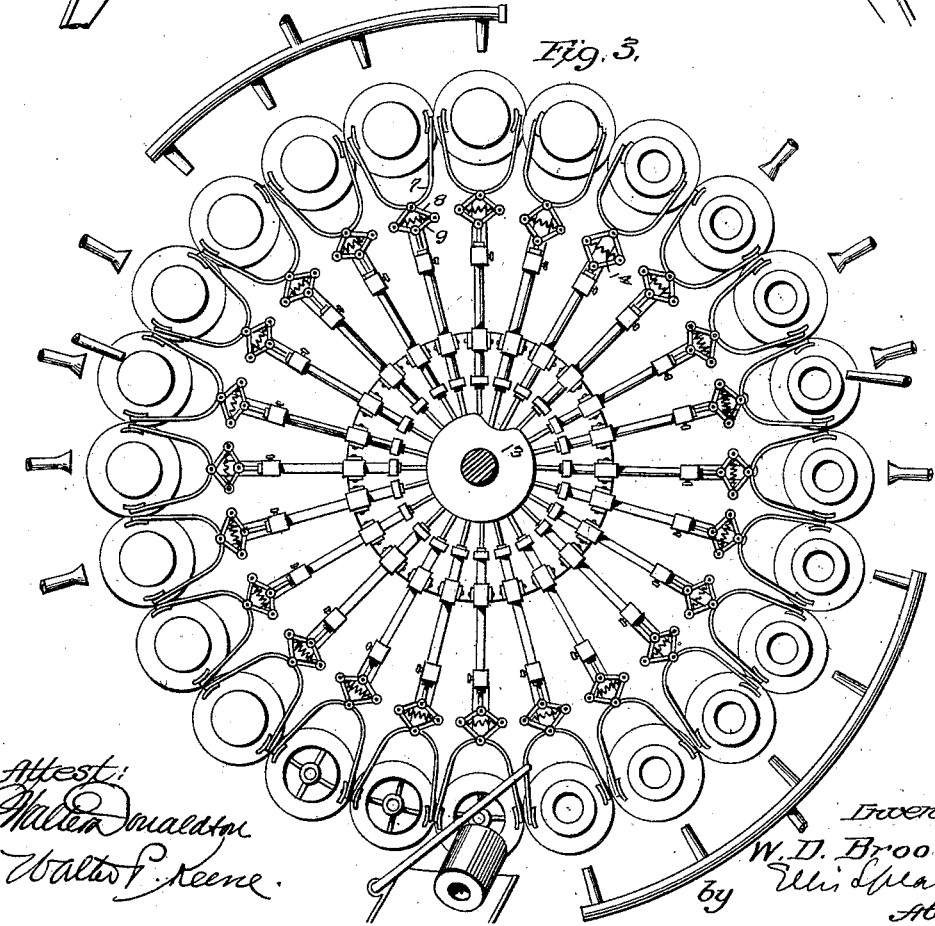
Figure 6:
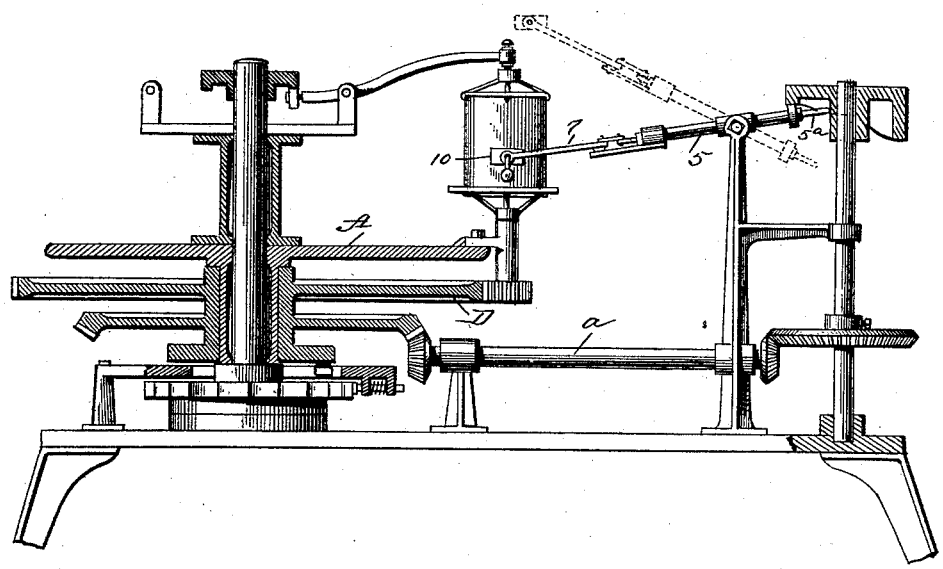

In the accompanying drawings, Figure 1 is an elevation of the can-soldering machine, partly in section. Fig. 2 is a like view with the parts in different positions. Fig. 3 is a plan view, and Figs. 4 and 5 represent details. Fig. 6 represents a modification relating to the means for inverting the can. Fig. 7 is a detail view of the top plate of the flame-chamber.

The machine represented in the drawings is generally similar to machines illustrated in patents heretofore granted me comprising the table A, a central shaft operated continuously or intermittingly, a series of can-holders mounted upon the table and rotating therewith, with a master-wheel for giving the can-seats independent rotary movement. These parts may be of ordinary construction and may operate in the manner well-known to those skilled in the art, with the exceptions hereinafter noted.

The base or table A' supports all the working parts and power is communicated to the apparatus from any suitable source through band-pulleys on the shaft $a$, which rotates the main shaft C, either continuously or intermittingly, in a well-known manner. The rotary movement of the shaft C is imparted to the table A carried thereby, and to the can-holders mounted upon the table. The can-holders are provided with seats for the cans, and these seats have a spindle extending through the holders and provided with gears on their lower ends which are in mesh with a master-wheel D, and through the rotation of this wheel the can-seats are given rotary movement independent of the rotation of the table A. Heretofore, as I have before stated, this additional rotation imparted to the can-seats has been continuously in one direction; but in the present case to attain the object referred to—namely, of preventing an uneven distribution of the solder in the centrifugal action of the seats—I impart a reciprocating movement to the can-seat by reversing the direction of the movement of the master-wheel at stated intervals, which may comprise one or more revolutions of the master-wheel in each direction, or a part of a revolution thereof. This reciprocating movement may be imparted in any well-known manner; but in the drawings accompanying this case I have represented a cam $b$, mounted on a projection extending from the table and rotated by a gear-connection with the shaft $a$, as shown at $c$. This rotary movement imparted to the cam $b$ is converted into reciprocating rotary movement to the master-wheel through a horizontal rack-bar $d$, having a pin upon one end fitting the groove in the cam $b$, the rack meshing with a gear formed on the hub-extension of the master-wheel D.

Each can-seat is encircled by a plate $e$, arranged slightly above the level of the seat proper, and serves to confine the heat and direct it to the edge of the can to be soldered, which is directly below the under surface of the plate; and, further, this plate tends to prevent the displacement of the can during the moments when it is not positively held by the holding devices arranged above each can-seat. When the cans are soldered from the outside, it is desirable to provide a stationary solder-tube, which is located relatively to the flame-tube, and as it is also desirable to apply the solder directly to the seam upon the lower edge of the can it is necessary to provide means whereby access may be had to this seam when the can approaches the solder-station. Ordinarily the plate $e$ covers the seam, and it is necessary to provide for the exposure of the seam at the proper time. This has been done, as has been stated, by raising the can, by lowering the whole top plate, and in another construction by forming the plate with a permanent depression on its front. The latter plan is objectionable, however, as it prevents the full effect of the heat to the edge to be soldered. I attain this object by simply pivoting the plate $e$ on a bracket 1, extending from the can-holder. Each plate has a rear extension 2, provided with a roller on its end, which is operated by a cam 3 on the stationary post $C'$, the cam being so constructed as to depress the front end of the plate as soon as the solder-station is reached. A spring 4 immediately returns the plate to normal position, and the seam is thus exposed only for the brief space of time for effecting the feeding of the solder.

The solder-feeding mechanism is represented at E, and may be of the construction shown or any suitable form of feed mechanism, the solder being carried upon a spool or reel on the upper end of the central shaft.

The holding caps or spiders are of well-known construction, and are operated in the usual manner by a cam on the main shaft.

I have shown the present machine adapted to solder first one end of the can and then the other, continuously, and in order to do this it is necessary that after one end has been heated, soldered, and cooled, the can be inverted and the opposite end be treated in like manner. This part of my invention relates to the means for inverting the can. As shown in Figs. 1, 2, and 3, I provide for each can an arm 5, pivoted upon a post 6, supported from the table A, and these arms are provided with gripping-bails 7, which terminate in extensions 8, forming, with links 9, toggle-levers. These bails carry upon their front end holding-plates 10, slightly curved, these plates being pivoted loosely to the ends of the bails and preferably weighted, as shown at 11, to keep the plates in normal position and to return them thereto whenever displaced. A cam 12 acts upon the inner ends of the arms 5, and after a can has been soldered upon one end and cooled the cam 12 brings the arms 5 at this point into a position relatively to the can, as shown in Fig. 4—namely, below the central line thereof. As soon as the can has reached this point the extreme inner end of the rod $5^a$ sinks into a depression in the cam 13, which thus relaxes the tendency of the rod to keep the ends of the bail spread apart, and the spring 14, forming a part of the toggle-connection, operates to close the ends of the bail upon the cam. At this moment the holding-cap is lifted from the top of the can and the cam 12 depresses the inner end of the arm 5, thus elevating the outer end, and in the elevating movement, the can being held by the freely-pivoted plates 10 below the central line of the can, the said can will be inverted, after which the holding-spider will drop into place and the high part of the cam 13 will have been reached, thus forcing open the holding-jaws of the bail, and the operation of heating, soldering, and cooling will be carried on in the well-known manner.

It will be understood that in a continuously-operating machine it is necessary to provide inverting means for each can; but in case the machine is made to move intermittingly, as I have shown in Fig. 6, a single arm will be found sufficient, mounted upon a standard outside the line of movement of the machine, but operated in precisely the same way.

I desire it to be understood that I do not limit myself to a machine provided with a rotating table, as I may use a machine provided with an endless band, the table simply being a representative form. Neither do I limit myself to the use of the machine for tin cans alone, as it may be adapted without material change to other forms of receptacles. I may also solder the cans or receptacles on the inside or by outside soldering. The details of construction relating to the means for effecting the various movements may likewise be changed without departing from the spirit of my invention.

I claim as my invention—

1. The soldering-machine comprising seats carried upon a rotating support, and means for imparting to said seats reciprocating rotary movement, substantially as described.

2. A soldering-machine comprising can-seats carried upon a revoluble support, a master-wheel having a driving-connection with said can-seats, and means for giving rotary reciprocating movement to said master-wheel, substantially as described.

3. In combination, can-seats carried upon a revoluble support, a master-wheel for rotating the can-seats, a horizontal rack-bar for operating the master-wheel, and a cam for reciprocating the rack-bar, with means for operating the cam, substantially as described.

4. In combination with a can-seat, a plate $e$, having a pivoted connection with its support, and means for automatically depressing the said plate at the solder-station, substantially as described.

5. In combination with a can-seat of a soldering-machine, a plate $e$, having a pivoted connection with its support and a rear extension operated by the cam, substantially as described.

6. The combination, in a soldering-machine, of an inverter arranged to grasp the can below its central line, and means for elevating said inverter, whereby the can is inverted by gravity, substantially as described.

7. In combination with the can-seats of a soldering-machine, an inverter-arm 5 and gripping-bail arranged below the center of the can and provided with freely-pivoted clamping-plates, and means for operating the said arm, substantially as described.

In testimony whereof I have signed my name to this specification in the presence of two subscribing witnesses.

WM. D. BROOKS.

Witnesses:
 FELIX R. SULLIVAN,
 GEO. E. SAVILLE.